United States Patent
Iwai et al.

(10) Patent No.: US 8,978,842 B2
(45) Date of Patent: *Mar. 17, 2015

(54) BICYCLE DISC BRAKE ROTOR

(75) Inventors: Toru Iwai, Osaka (JP); Makoto Souwa, Osaka (JP)

(73) Assignee: Shimano Inc., Osaka (JP)

( * ) Notice: Subject to any disclaimer, the term of this patent is extended or adjusted under 35 U.S.C. 154(b) by 117 days.

This patent is subject to a terminal disclaimer.

(21) Appl. No.: 13/405,676

(22) Filed: Feb. 27, 2012

(65) Prior Publication Data

US 2013/0133996 A1    May 30, 2013

Related U.S. Application Data

(63) Continuation-in-part of application No. 13/304,330, filed on Nov. 24, 2011, now Pat. No. 8,813,921.

(51) Int. Cl.
| | |
|---|---|
| F16D 65/12 | (2006.01) |
| C23C 4/02 | (2006.01) |
| C23C 4/18 | (2006.01) |
| C23C 24/04 | (2006.01) |
| F16D 65/847 | (2006.01) |
| F16D 65/78 | (2006.01) |

(52) U.S. Cl.
CPC ............... F16D 65/128 (2013.01); C23C 4/02 (2013.01); C23C 4/18 (2013.01); C23C 24/04 (2013.01); *F16D 65/847* (2013.01); *F16D 2065/789* (2013.01); *F16D 2200/0021* (2013.01); *F16D 2200/0026* (2013.01)
USPC ...................... 188/218 XL; 188/26

(58) Field of Classification Search
CPC .. F16D 65/128; F16D 65/1328; F16D 65/788

USPC .................................. 188/218 XL, 18 A, 26
See application file for complete search history.

(56) References Cited

U.S. PATENT DOCUMENTS

| | | | | |
|---|---|---|---|---|
| 2,728,421 | A | * | 12/1955 | Butler ...................... 188/218 XL |
| 3,534,464 | A | * | 10/1970 | Lallemant ...................... 228/176 |
| 5,163,526 | A | * | 11/1992 | Morgun et al. ........... 188/250 G |
| 6,119,818 | A | | 9/2000 | Krumbeck et al. |
| 6,290,032 | B1 | | 9/2001 | Patrick et al. |
| 7,284,643 | B1 | | 10/2007 | Kao |
| 7,857,111 | B1 | | 12/2010 | Moore |
| 2003/0178265 | A1 | | 9/2003 | Chen |
| 2005/0006186 | A1 | | 1/2005 | Iwai et al. |
| 2006/0037819 | A1 | | 2/2006 | Takizawa |
| 2008/0302616 | A1 | | 12/2008 | Kao |

(Continued)

FOREIGN PATENT DOCUMENTS

| DE | 4437160 A1 | 4/1996 |
|---|---|---|
| EP | 183036 A2 | 6/1986 |

(Continued)

*Primary Examiner* — Bradley King
(74) *Attorney, Agent, or Firm* — Global IP Counselors

(57) ABSTRACT

A bicycle disc brake rotor basically has an outer portion, an inner portion and an intermediate portion. The outer portion is made of a first material. The inner portion is made of the first material. The intermediate portion is disposed between the outer portion and the inner portion. The intermediate portion is made of the first material. The intermediate portion is at least partially laminated by a layer made of a second material. The second material is different from the first material. The layer has a contour tracing a contour of the intermediate portion.

20 Claims, 7 Drawing Sheets

(56) References Cited

U.S. PATENT DOCUMENTS

2011/0240420 A1   10/2011   Souwa et al.
2012/0000736 A1    1/2012   Koshiyama

FOREIGN PATENT DOCUMENTS

| | | |
|---|---|---|
| JP | 2010-266020 A | 11/2010 |
| WO | 2007/043961 A1 | 4/2007 |

* cited by examiner

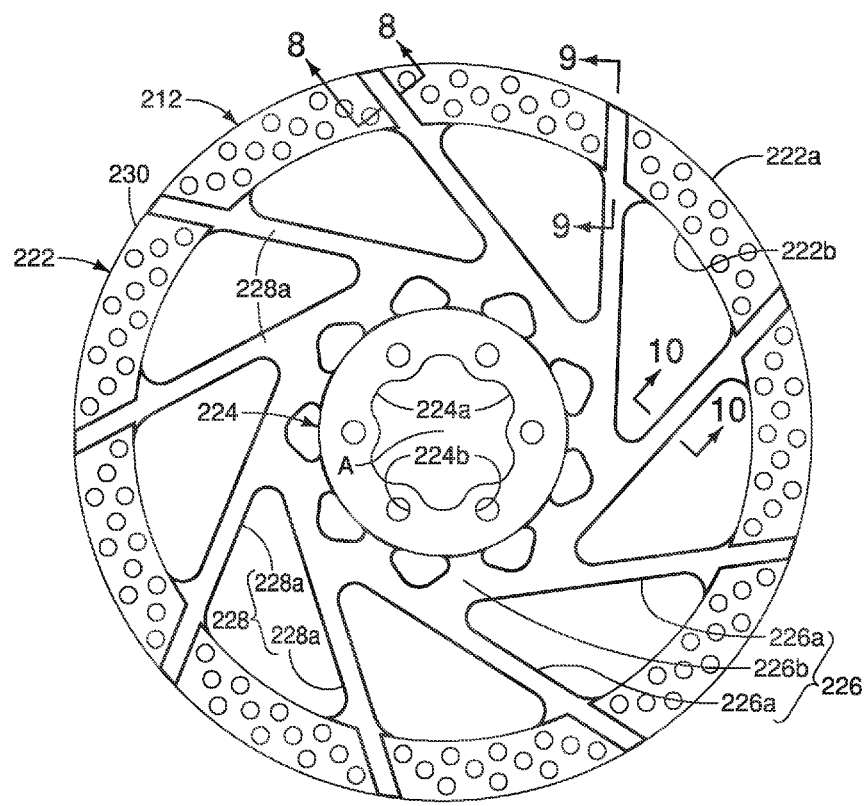
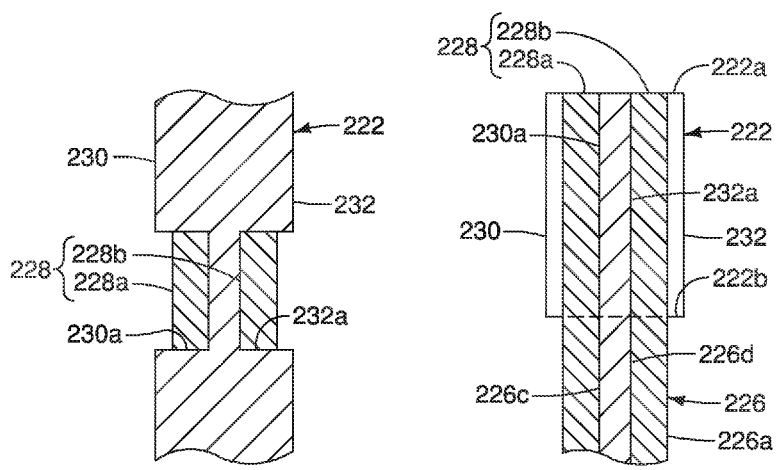
FIG. 7
FIG. 8   FIG. 9

BICYCLE DISC BRAKE ROTOR

This application is a continuation-in-part application of U.S. patent application Ser. No. 13/304,330 filed on Nov. 24, 2011. The entire disclosure of U.S. patent application Ser. No. 13/304,330 is hereby incorporated herein by reference.

BACKGROUND

1. Field of the Invention

This invention generally relates to a bicycle disc brake rotor. More specifically, the present invention relates to a bicycle disc brake rotor with a configuration that promotes cooling of the braking surfaces.

2. Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or back wheel of a bicycle. The brake pads are pressed against a brake disc or rotor that is fixed to the wheel to slow down or stop the rotation of the disc, and thus, slow down or stop the rotation of the wheel.

SUMMARY

While disc brake systems provide excellent performance, the braking action tends to generate a substantial amount of heat in the disc brake rotor. Thus, one aspect present in this disclosure is to provide a disc brake rotor with a configuration that promotes cooling of the disc brake rotor.

In view of the state of the known technology, a bicycle disc brake rotor is basically provided that comprises an outer portion, an inner portion and an intermediate portion. The outer portion is made of a first material. The inner portion is made of the first material. The intermediate portion is disposed between the outer portion and the inner portion. The intermediate portion is made of the first material. The intermediate portion is at least partially laminated by a layer made of a second material. The second material is different from the first material. The layer has a contour tracing a contour of the intermediate portion.

These and other objects, features, aspects and advantages of the disclosed bicycle disc brake rotor will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 7 is a side elevational view of a bicycle disc brake rotor in accordance with a third embodiment;

FIG. 8 is a cross sectional view of the bicycle disc brake rotor illustrated in FIG. 7 as seen along section line 8-8 of FIG. 7;

FIG. 9 is a cross sectional view of the bicycle disc brake rotor illustrated in FIGS. 7 and 8 as seen along section line 9-9 of FIG. 7;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
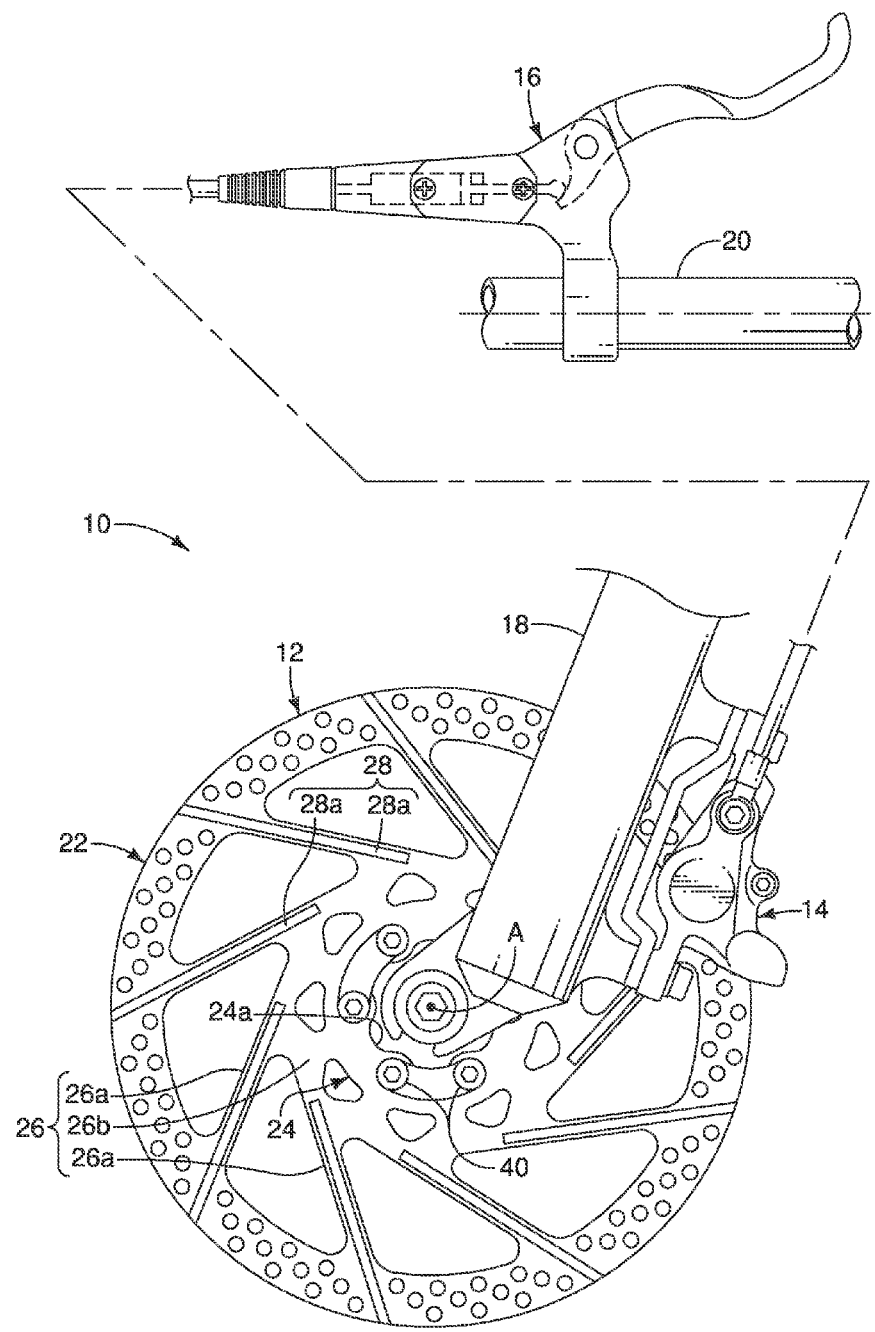
FIG. 1 is a side elevational view of a front disc brake system including a bicycle disc brake rotor in accordance with a first embodiment.

Referring initially to FIG. 1, a front disc brake system 10 is illustrated that includes a bicycle disc brake rotor 12 in accordance with a first embodiment. As explained below, the bicycle disc brake rotor 12 has a configuration that promotes cooling of the bicycle disc brake rotor 12. The front disc brake system 10 further includes a bicycle disc brake caliper 14 and a brake operating (actuating) mechanism 16. Basically, the bicycle disc brake rotor 12 is fixedly attached to a hub (not shown) of a bicycle wheel (not shown). The bicycle disc brake caliper 14 is mounted to a bicycle fork 18, while brake operating mechanism 16 is attached to a bicycle handlebar 20. Since the operation and construction of the front disc brake system 10 is conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 2:
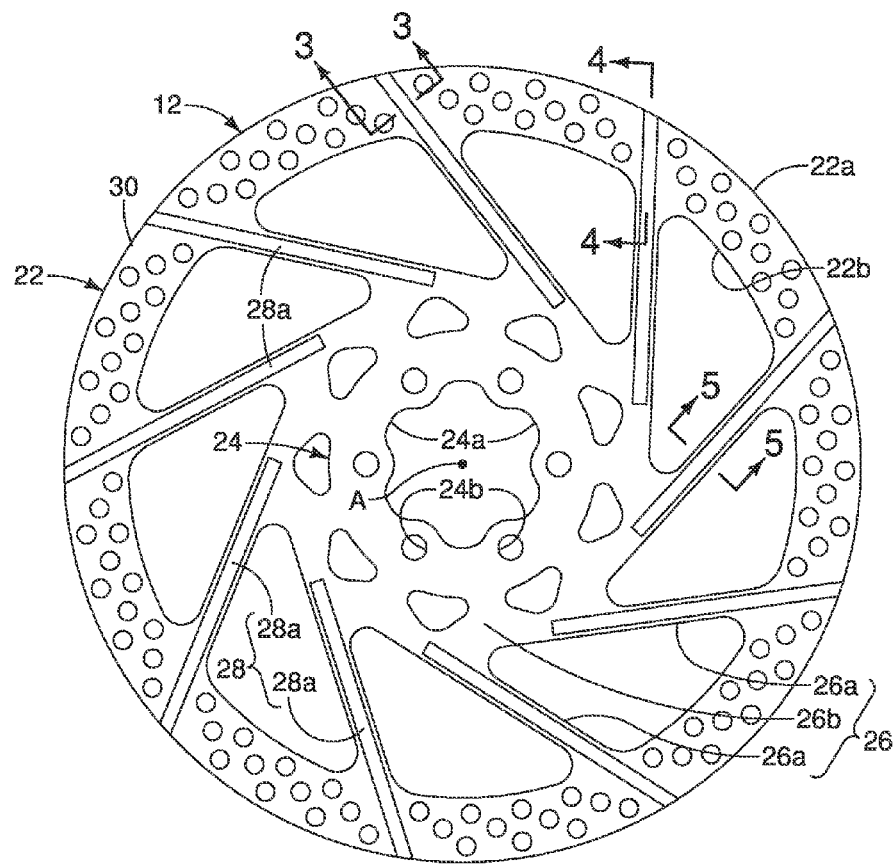
FIG. 2 is a side elevational view of the bicycle disc brake rotor illustrated in FIG. 1.

Referring now to FIG. 2, the bicycle disc brake rotor 12 basically has an outer portion 22, an inner portion 24 and an intermediate portion 26. The intermediate portion 26 is disposed between the outer and inner portions 22 and 24, and interconnects the outer and inner portions 22 and 24 together. At least the intermediate portion 26 is at least partially laminated by a layer 28 that is designed to promote cooling of the bicycle disc brake rotor 12. In this first embodiment, the layer 28 extends along sections of the outer portion 22 and the intermediate portion 26. The layer 28 is preferably at least a thermally sprayed layer that is bonded to the outer portion 22 and the intermediate portion 26 by a cold spraying process. The layer 28 has a contour that at least traces a contour of the outer portion 22 and a contour of the intermediate portion 26.

In the first illustrated embodiment, the inner portion 24 is integrally formed at the intermediate portion 26 as a one-piece member. The inner portion 24 includes an opening 24a for accommodating a hub axle therethrough, and a plurality of hub mounting holes 24b that are arranged circumferentially about a center rotational axis A of the bicycle disc brake rotor 12. The inner portion 24 constitutes a hub mounting portion that is mounted to a bicycle hub by a plurality of bolts 40 as seen in FIG. 1. Thus, the bicycle disc brake rotor 12 rotates with the bicycle hub about the center rotational axis A.

In the first embodiment, the outer portion 22, the inner portion 24 and the intermediate portion 26 are integrally formed as a one-piece member of a suitable first material such as stainless steel. The layer 28 is made of a second material (e.g., copper) that is different from the first material (e.g., stainless steel). Preferably, the material of the layer 28 has a higher thermal conductivity than the material of the outer portion 22. Here in the first embodiment, the intermediate portion 26 includes of a plurality of connecting arms 26a with the inner ends of the connecting arms 26a connected together by a ring shaped joining portion 26b. The outer ends of the connecting arms 26a are coupled to the outer portion 22.

Since the intermediate portion 26 is formed with the connecting arms 26a, the layer 28 is also formed with a plurality thermally sprayed layer portions 28a and 28b by a cold spraying process. The thermally sprayed layer portions 28a are thermally sprayed layers that are laminated to a first axial face 26c of each of the connecting arms 26a of the intermediate portion 26. The thermally sprayed layer portions 28b are thermally sprayed layers that are laminated to a second axial face 26d of each of the connecting arms 26a of the intermediate portion 26.

Figures 3, 4:
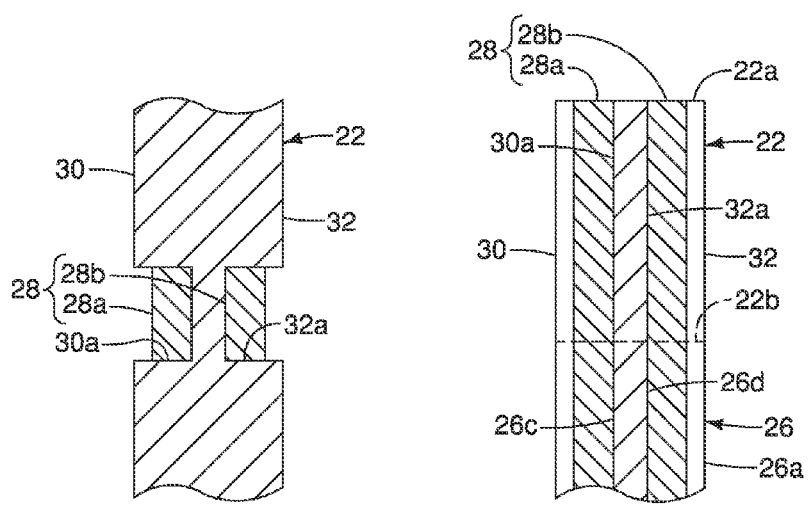
FIG. 3 is a cross sectional view of the bicycle disc brake rotor illustrated in FIGS. 1 and 2 as seen along section line 3-3 of FIG. 2.
FIG. 4 is a cross sectional view of the bicycle disc brake rotor illustrated in FIGS. 1 to 3 as seen along section line 4-4 of FIG. 2.
Figure 5:
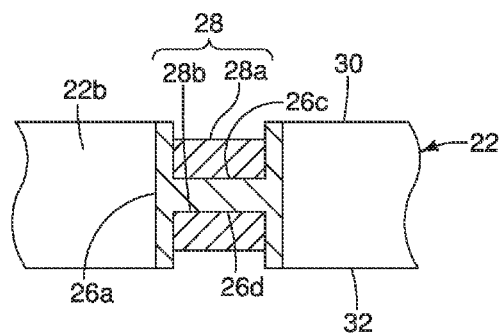
FIG. 5 is a cross sectional view of the bicycle disc brake rotor illustrated in FIGS. 1 to 4 as seen along section line 5-5 of FIG. 2.

While the outer portion 22 is illustrated as being integral with the intermediate portion 26, it will be apparent that the outer portion 22 could be provided with one or more attachment structures such that the outer portion 22 and the intermediate portion 26 are separate parts that are attached together. In both cases, preferably, the outer portion 22 and the intermediate portion 26 are made of the same (first) material. In this first embodiment, the outer portion 22 is an outer annular or ring-shaped portion that defines a pair of friction braking surfaces 30 and 32. The braking surface 30 preferably has a plurality of recesses 30a. Similarly, the braking surface 32 preferably has a plurality of recesses 32a. The recesses 30a and 32a extend from an outer peripheral edge 22a of the outer portion 22 to an inner peripheral edge 22b of the outer portion 22. More preferably, these recesses 30a and 32a extend from an outer peripheral edge 22a of the outer portion 22 to the joining portion 26b. As seen in FIGS. 3 and 4, these recesses 30a and 32a are laminated with the thermally sprayed layer portions 28a and 28b by a cold spraying process. Preferably, the exterior surfaces of the thermally sprayed layer portions 28a and 28b are recessed from the friction braking surfaces 30 and 32. In other words, the thermally sprayed layer portions 28a and 28b are recessed within the recesses 30a and 32a with respect to a corresponding one of the friction braking surfaces 30 and 32.

Figure 6:
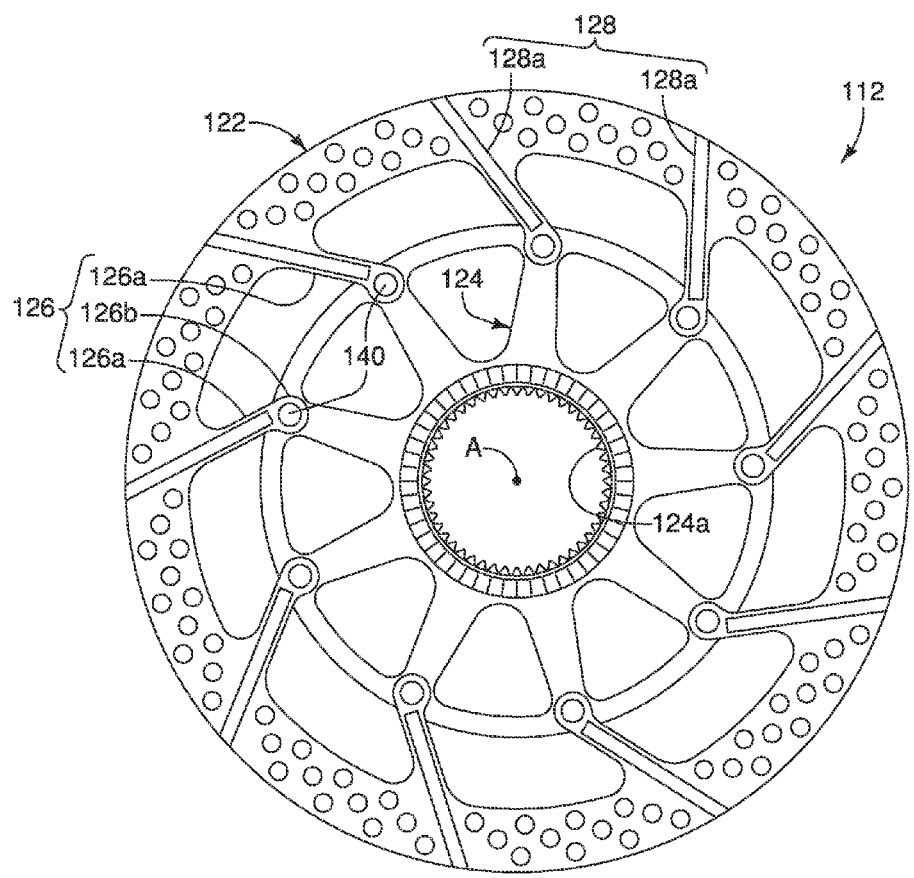
FIG. 6 is a side elevational view of a bicycle disc brake rotor in accordance with a second embodiment.
Figure 10:
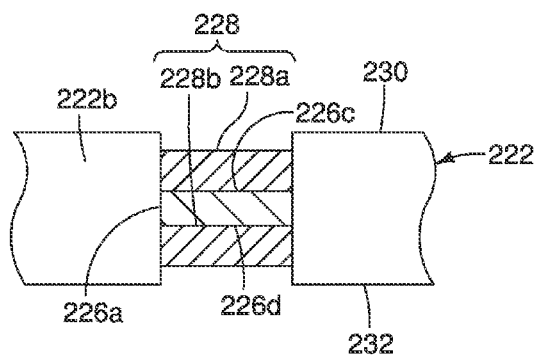
FIG. 10 is a cross sectional view of the bicycle disc brake rotor illustrated in FIGS. 7 to 9 as seen along section line 10-10 of FIG. 7.

Referring now to FIG. 6, a bicycle disc brake rotor 112 in accordance with a second embodiment will now be explained. The bicycle disc brake rotor 112 basically has an outer portion 122, an inner portion 124 and an intermediate portion 126. The intermediate portion 126 is disposed between the outer portion 122 and the inner portion 124 and interconnects the outer portion 122 and the inner portion 124 together. The outer portion 122 and the intermediate portion 126 are integrally formed as a one-piece member of the first material. The inner portion 124 is a separate member that is fixed to the inner end of the intermediate portion 126 by fasteners such as the rivets 140 as illustrated. The inner portion 124 has a hub mounting opening 124a that has a plurality of serrations.

The layer 128 is made of a second material (e.g., copper) that is different from the first material (e.g., stainless steel). Preferably, the material of the layer 128 has a higher thermal conductivity than the material of the outer portion 122. Here in the second embodiment, the intermediate portion 126 includes of a plurality of connecting arms 126a with each of the connecting arms 126a having an attachment portion 126b at its inner free end. Thus, the layer 128 is formed of a plurality individual layer portions 128a. The thermally sprayed layer portions 128a are thermally sprayed layers that are bonded to each axial face of each of the connecting arms 126a of the intermediate portion 126. In view of the similarities between the bicycle disc brake rotors 12 and 112, the bicycle disc brake rotor 112 will not be discussed in great detail herein.

Referring now to FIGS. 7 to 10, a bicycle disc brake rotor 212 in accordance with a third embodiment will now be explained. The bicycle disc brake rotor 212 basically has an outer portion 222, an inner portion 224 and an intermediate portion 226. The bicycle disc brake rotor 212 is basically identical to the bicycle disc brake rotor 12, as discussed above, except that each side of the intermediate portion 226 is completely laminated by a layer 228 and the recesses have been eliminated in the intermediate portion 226. The periphery of the layer 228 is indicated by a thicker line in FIG. 7. The layer 228 overlies sections of friction braking surfaces 230 and 232 of the outer portion 222. The layer 228 is made of a second material (e.g., copper) that is different from the first material (e.g., stainless steel) of the outer portion 222, the inner portion 224 and the intermediate portion 226. Preferably, the material of the layer 228 has a higher thermal conductivity than the material of the outer portion 222.

In this third embodiment, similar to the first embodiment, the inner portion 224 includes an opening 224a for accommodating a hub axle therethrough, and a plurality of hub mounting holes 224b that are arranged circumferentially about a center rotational axis A of the bicycle disc brake rotor 212. Of course, it will be apparent from this disclosure that the inner portion 224 can have other mounting configurations (e.g., a center opening with serrations such as the hub mounting opening 124a of FIG. 6).

In this third embodiment, similar to the first embodiment, the intermediate portion 226 is integrally formed with both the outer portion 222 and the inner portion 224 as a one-piece member. In particular, in this third embodiment, the intermediate portion 226 includes of a plurality of connecting arms 226a with outer ends connected to the outer portion 222 and the inner ends connected together by a ring shaped joining portion 226b that is connected to the inner portion 224. The connecting arms 226a and the ring shaped joining portion 226b are laminated with the layer 228.

In this third embodiment, as seen in FIGS. 8 and 9, the layer 228 includes a thermally sprayed layer portion 228a and a thermally sprayed layer portion 228b. The thermally sprayed layer portion 228a is laminated to a first axial face 226c of the intermediate portion 226, while the thermally sprayed layer portion 228b is laminated to a second axial face 226d of the intermediate portion 226. In this third embodiment, similar to prior embodiments, the layer 228 also extends along sections of the outer portion 222. Thus, the layer 228 is preferably at least a thermally sprayed layer that is bonded to sections of the outer portion 222 and the intermediate portion 226 by a cold spraying process. Preferably, recesses 230a and 232a of the friction braking surfaces 230 and 232 are provided with the thermally sprayed layer portions 228a and 228b similar to the first embodiment. Preferably, the exterior surfaces of the thermally sprayed layer portions 228a and 228b are recessed from the friction braking surfaces 230 and 232. However, if needed and/or desired, the thermally sprayed layer portions 228a and 228b could be flush with the corresponding one of the friction braking surfaces 230 and 232. Also preferably, within the recesses 230a and 232a, the thermally sprayed layer portions 228a and 228b extend completely between outer and inner peripheral edges 222a and 222b of the outer portion 222. In view of the similarities between the bicycle disc brake rotors 12 and 212, the bicycle disc brake rotor 212 will not be discussed in further detail.

Figure 11:
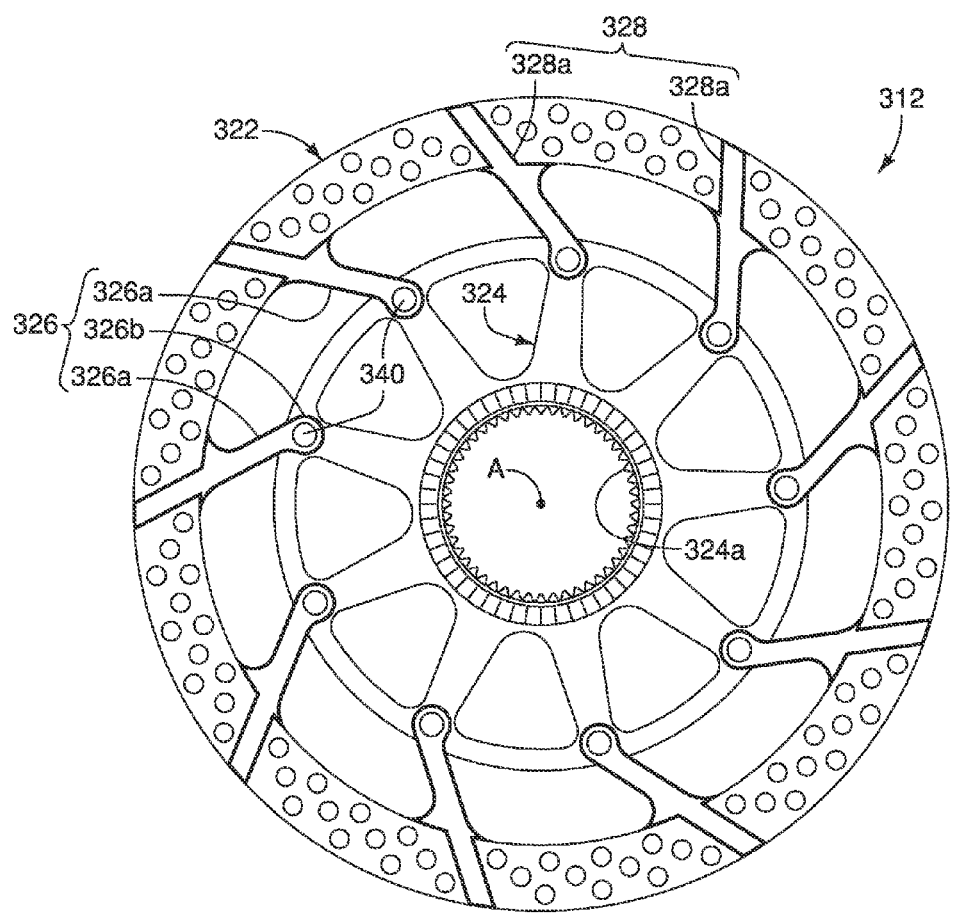
FIG. 11 is a side elevational view of a disc brake rotor in accordance with a fourth embodiment.

Referring now to FIG. 11, a bicycle disc brake rotor 312 in accordance with a fourth embodiment will now be explained. The bicycle disc brake rotor 312 basically has an outer portion 322, an inner portion 324 and an intermediate portion 326. The intermediate portion 326 is disposed between the outer portion 322 and the inner portion 324 and interconnects the outer portion 322 and the inner portion 324 together. The outer portion 322 and the intermediate portion 326 are integrally formed as a one-piece member of the first material (e.g., stainless steel). The inner portion 324 is a separate member that is fixed to the inner end of the intermediate portion 326 by fasteners such as the rivets 340 as illustrated. The inner portion 324 has a hub mounting opening 324a that has a plurality of serrations. The bicycle disc brake rotor 312 is identical to the bicycle disc brake rotor 112, as discussed above, except that each side of the intermediate portion 326 is completely laminated by a layer 328 and the recesses have been eliminated in the intermediate portion 326.

The layer 328 is made of a second material (e.g., copper) that is different from the first material (e.g., stainless steel). Preferably, the material of the layer 328 has a higher thermal conductivity than the material of the outer portion 322. Here in the second embodiment, the intermediate portion 326 includes of a plurality of connecting arms 326a with each of the connecting arms 326a having an attachment portion 326b at its inner free end. Thus, the layer 328 is formed of a plurality individual layer portions 328a. The thermally sprayed layer portions 328a are thermally sprayed layers that are bonded to each axial face of each of the connecting arms 326a of the intermediate portion 326. In view of the similarities between the bicycle disc brake rotors 112 and 312, the bicycle disc brake rotor 312 will not be discussed in great detail herein.

Figure 12:
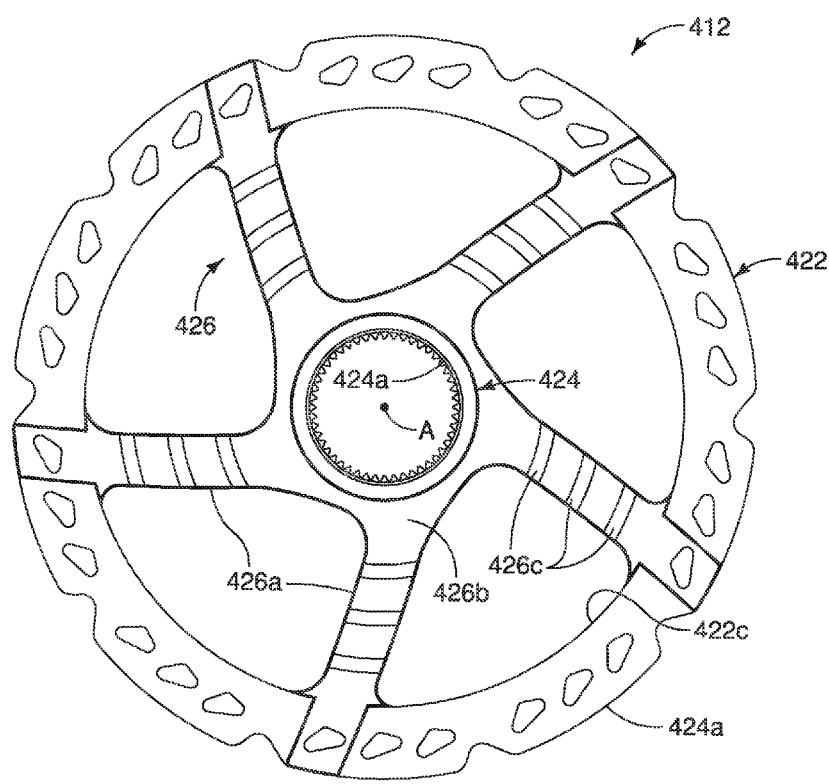
FIG. 12 is a side elevational view of a disc brake rotor in accordance with a fifth embodiment.
Figure 13:
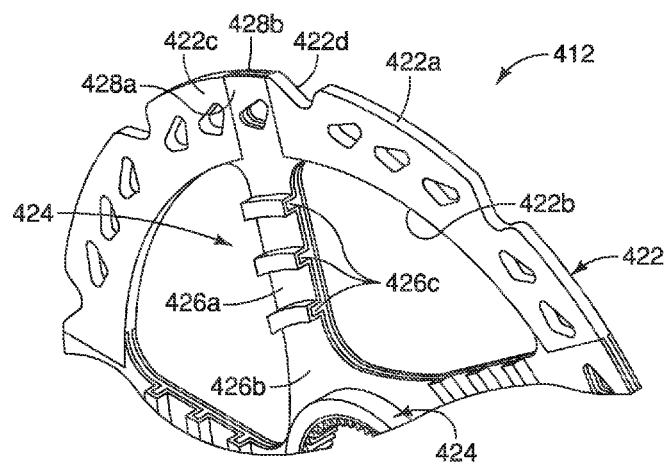
FIG. 13 is an enlarged perspective view of the bicycle disc brake rotor illustrated in FIG. 12.

Referring now to FIGS. 12 and 13, a bicycle disc brake rotor 412 in accordance with a fifth embodiment will now be explained. The bicycle disc brake rotor 412 basically has an outer portion 422, an inner portion 424 and an intermediate portion 426. Also each side of the intermediate portion 426 is completely laminated by a layer 428. The periphery of the layer 428 is indicated by a thicker line in FIG. 12. The layer 428 also overlies sections of friction braking surfaces of the outer portion 422. The layer 428 is made of a second material (e.g., copper) that is different from the first material (e.g., stainless steel) of the outer portion 422, the inner portion 424 and the intermediate portion 426. Preferably, the material of the layer 428 has a higher thermal conductivity than the material of the outer portion 422. The bicycle disc brake rotor 412 is basically identical in construction to the bicycle disc brake rotor 212, as discussed above, except that the shapes of the outer portion 422, the inner portion 424, the intermediate portion 426 and the layer 428 have been changed. In particular, for example, the inner portion 424 includes a hub mounting opening 424a that has a plurality of serrations arranged circumferentially about a center rotational axis A. Of course, it will be apparent from this disclosure that the inner portion 424 can have other mounting configurations.

In this fifth embodiment, similar to the first and third embodiments, the intermediate portion 426 is integrally formed with both the outer portion 422 and the inner portion 424 as a one-piece member. In particular, in this fifth embodiment, the intermediate portion 426 includes of a plurality of connecting arms 426a with outer ends connected to the outer portion 422 and the inner ends connected together by a ring shaped joining portion 426b that is connected to the inner portion 424. The connecting arms 426a and the ring shaped joining portion 426b are laminated with the layer 228. The connecting arms 426a also each has a plurality of cooling ribs 426c. Each of the cooling ribs 426c constitutes a cooling projection. The layer 428 completely covers the axial faces of the cooling ribs 426c and the surfaces of the cooling ribs 426c that extends between the axial faces of the cooling ribs 426c and the axial faces of the connecting arms 426a as seen in FIG. 13.

In this fifth embodiment, as seen in FIG. 13, the layer 428 includes a thermally sprayed layer portion 428a and a thermally sprayed layer portion 428b. The thermally sprayed layer portion 428a is laminated to a first axial face of the intermediate portion 426, while the thermally sprayed layer portion 428b is laminated to a second axial face of the intermediate portion 426. In this fifth embodiment, similar to prior embodiments, the layer 428 also extends along sections of the outer portion 422. Thus, the layer 428 is preferably at least a thermally sprayed layer that is bonded to sections of the outer portion 422 and the intermediate portion 426 by a cold spraying process. Preferably, the friction braking surfaces of the outer portion 422 has recesses with the thermally sprayed layer portions 428a and 428b disposed therein similar to the prior embodiments. Preferably, the thermally sprayed layer portions 428a and 428b extend completely between outer and inner peripheral edges 422a and 422b of the outer portion 422. In view of the similarities between the bicycle disc brake rotor 412 and the prior embodiments, the bicycle disc brake rotor 412 will not be discussed in further detail.

Figure 14:
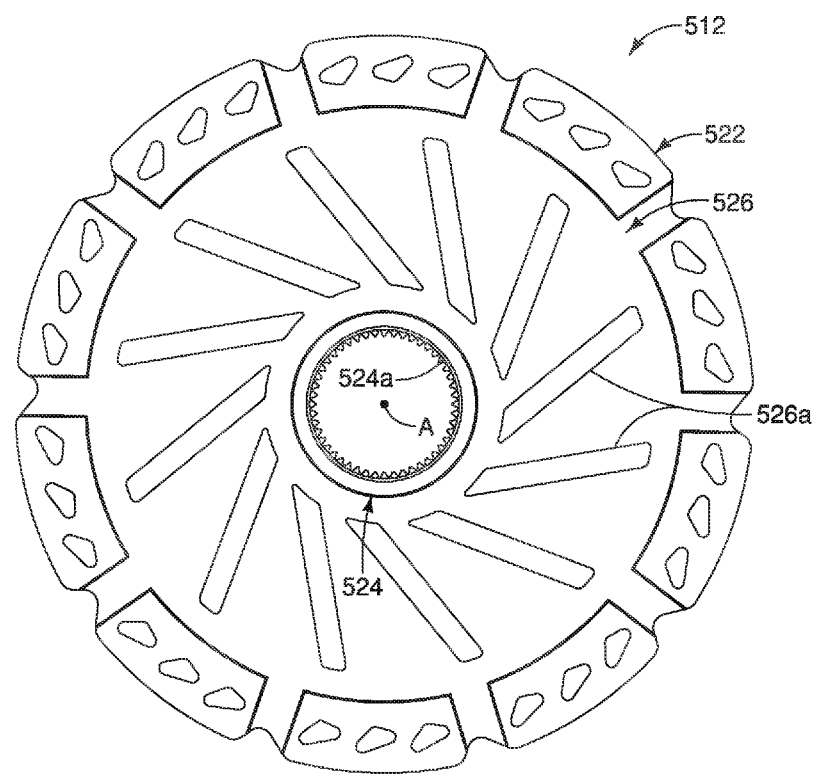
FIG. 14 is a side elevational view of a disc brake rotor in accordance with a sixth embodiment.
Figure 15:
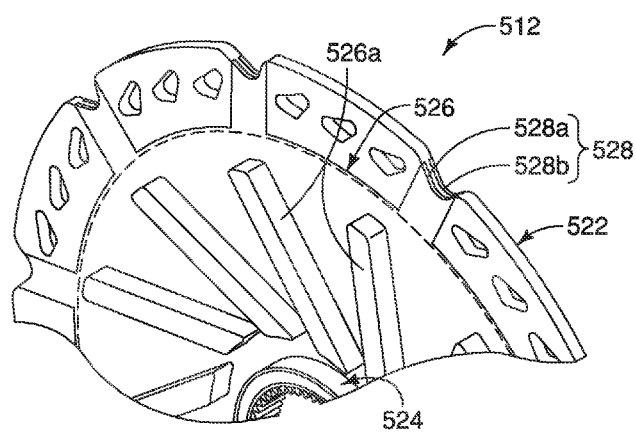
FIG. 15 is an enlarged perspective view of the bicycle disc brake rotor illustrated in FIG. 14.

Referring now to FIGS. 14 and 15, a bicycle disc brake rotor 512 in accordance with a sixth embodiment will now be explained. The bicycle disc brake rotor 512 basically has an outer portion 522, an inner portion 524 and an intermediate portion 526. Also each axial face of the intermediate portion 526 is completely laminated by a layer 528. The periphery of the layer 528 is indicated by a thicker line in FIG. 14. The layer 528 also overlies sections of friction braking surfaces of the outer portion 522. The layer 528 is made of a second material (e.g., copper) that is different from the first material (e.g., stainless steel) of the outer portion 522, the inner portion 524 and the intermediate portion 526. Preferably, the material of the layer 528 has a higher thermal conductivity than the material of the outer portion 522.

The bicycle disc brake rotor 512 is basically identical in construction to the bicycle disc brake rotor 412, as discussed above, except that the shapes of the outer portion 522, the intermediate portion 526 and the layer 528 have been changed. In particular, instead of a plurality of connecting arms, the intermediate portion 526 is a single continuous annular disc that extends between the outer portion 522 and the inner portion 524 in this sixth embodiment. The annular disc that forms the intermediate portion 526 can be perforated or non-perforated as illustrated. The intermediate portion 526 preferably includes a plurality of protruding members 526a that form cooling fins or blocks. Each of the protruding members 526a constitutes a cooling projection. However, the protruding members 526a can other cooling configurations such as a single protruding member (e.g., a single spiral protruding member) can be used if needed and/or desired. The layer 528 completely covers the protruding members 526a as seen in FIG. 15.

In this sixth embodiment, similar to some of the prior embodiments, the inner portion 524 includes a hub mounting opening 524a that has a plurality of serrations arranged circumferentially about a center rotational axis A. Of course, it will be apparent from this disclosure that the inner portion 524 can have other mounting configurations. Also, in this sixth embodiment, similar to some of the prior embodiments, the intermediate portion 526 is integrally formed with both the outer portion 522 and the inner portion 524 as a one-piece member.

In this sixth embodiment, as seen in FIG. 15, the layer 528 includes a thermally sprayed layer portion 528a and a thermally sprayed layer portion 528b. The thermally sprayed layer portion 528a is laminated to a first axial face of the intermediate portion 526, while the thermally sprayed layer portion 528b is laminated to a second axial face of the intermediate portion 526. Preferably, the thermally sprayed layer portions 528a and 528b completely cover both the first and second axial faces of the intermediate portion 526 as illustrated. Alternatively, the thermally sprayed layer portions 528a and 528b only partially cover each of the first and second axial faces of the intermediate portion 526, or only one of the first and second axial faces of the intermediate portion 526 is either completely or partially covered with the layer 528. In this sixth embodiment, similar to prior embodiments, the layer 528 also extends along sections of the outer portion 522. Thus, the layer 528 is preferably at least a thermally sprayed layer that is bonded to sections of the outer portion 522 and the intermediate portion 526 by a cold spraying process. Preferably, the friction braking surfaces of the outer portion 522 has recesses with the thermally sprayed layer portions 528a and 528b disposed therein similar to the prior embodiments. Preferably, the thermally sprayed layer portions 528a and 528b extend completely between outer and inner peripheral edges of the outer portion 522. In view of the similarities between the bicycle disc brake rotor 512 and the prior embodiments, the bicycle disc brake rotor 512 will not be discussed in further detail.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle disc brake rotor comprising:
   an outer portion made of a first material, and including at least one recess formed in at least one of a pair of friction braking surfaces formed by the outer portion;
   an inner portion made of the first material; and
   an intermediate portion disposed between the outer portion and the inner portion, the intermediate portion being made of the first material;
   the intermediate portion being at least partially laminated by a layer made of a second material, the second material being different front the first material, the layer extending from the at least one recess and having a contour tracing a contour of the intermediate portion.

2. The bicycle disc brake rotor according to claim 1, wherein
   the layer includes a thermally sprayed layer provided by a thermally spray on the intermediate portion.

3. The bicycle disc brake rotor according to claim 1, wherein
   the layer is recessed within the at least one recess with respect to the at least one of the friction braking surfaces that includes the at least one recess.

4. The bicycle disc brake rotor according to claim 2, wherein
   the layer extends along opposite axial faces of the intermediate portion.

5. The bicycle disc brake rotor according to claim 2, wherein
   the outer portion includes at least one recess formed in each one of a pair of friction braking surface formed by oppositely facing sides of the outer portion, the recesses including the layer disposed therein.

6. The bicycle disc brake rotor according to claim 5, wherein
   the layer is recessed within the recesses with respect to a corresponding one of the friction braking surfaces that includes a corresponding one of the recesses.

7. The bicycle disc brake rotor according to claim 2, wherein
   the contour of the intermediate portion includes a recess with the layer disposed therein.

8. The bicycle disc brake rotor according to claim 2, wherein
   the intermediate portion includes a plurality of connecting arms, and the layer extends along at least one axial face of at least one of the connecting arms.

9. The bicycle disc brake rotor according to claim 8, wherein
   the layer extends along the at least one axial face of all of the connecting arms.

10. The bicycle disc brake rotor according to claim 8, wherein the at least one of the connecting arms includes a recess with the layer disposed therein.

11. The bicycle disc brake rotor according to claim 1, wherein
the layer is a copper layer that is bonded to the at least one of the intermediate portion by a cold spraying process.

12. The bicycle disc brake rotor according to claim 1, wherein
the outer portion and the intermediate portion are integrally formed as a one-piece member of the first material.

13. The bicycle disc brake rotor according to claim 12, wherein
the inner portion is a separate member that is fixed to the inner end of the intermediate portion.

14. The bicycle disc brake rotor according to claim 1, wherein
the outer portion, the intermediate portion and the inner portion are integrally formed as a one-piece member of the first material.

15. The bicycle disc brake rotor according to claim 1, wherein
the intermediate portion has opposite axial faces that are each completely laminated by the layer of the second material.

16. The bicycle disc brake rotor according to claim 1, wherein
the intermediate portion includes an annular disc that extends between the outer portion and the inner portion, and the layer of the second material extends along at least one axial face of the annular disc.

17. The bicycle disc brake rotor according to claim 1, wherein
the intermediate portion includes an annular disc that extends between the outer portion and the inner portion, and the layer of the second material extends along both opposite axial faces of the annular disc.

18. The bicycle disc brake rotor according to claim 1, wherein
the intermediate portion includes at least one cooling projection that is covered by the layer of the second material.

19. A bicycle disc brake rotor comprising:
an outer portion made of a first material, the outer portion including at least one recess formed in at least one of a pair of friction braking surface formed by the outer portion;
an inner portion made of the first material; and
an intermediate portion disposed between the outer portion and the inner portion, the intermediate portion being made of the first material, the intermediate portion being at least partially laminated by a copper layer, the copper layer being a different material than the first material, the copper layer having a contour tracing a contour of the intermediate portion,
the copper layer being provided by a thermally spray process, and extending from the at least one recess.

20. The bicycle disc brake rotor according to claim 19, wherein
the copper layer is provided to the intermediate portion.

* * * * *